MAGNETIC MEMORY DEVICE AND MAGNETIC CIRCUIT THEREFOR

Filed March 17, 1955 2 Sheets-Sheet 1

INVENTOR
FRANS VAN TONGERLOO
BY Fred M. Vogel
AGENT

MAGNETIC MEMORY DEVICE AND MAGNETIC CIRCUIT THEREFOR

Filed March 17, 1955 2 Sheets-Sheet 2

INVENTOR
FRANS VAN TONGERLOO
BY Fred M. Vogel
AGENT

United States Patent Office 2,974,308

Patented Mar. 7, 1961

2,974,308

MAGNETIC MEMORY DEVICE AND MAGNETIC CIRCUIT THEREFOR

Frans van Tongerloo, Eindhoven, Netherlands, assignor, by mesne assignments, to North American Philips Company, Inc., New York, N.Y., a corporation of Delaware Filed Mar. 17, 1955, Ser. No. 494,956

Claims priority, application Netherlands Apr. 15, 1954

5 Claims. (Cl. 340—174)

The invention relates to a device comprising a closed circuit of ferromagnetic material having high retentivity and a substantially parallelogram-shaped hysteresis loop and comprising at least one input winding and at least one output winding both coupled with the circuit.

As is well-known, such devices are used among other things, for recording coded information, the information being stored by means of the state of retentivity of this ferromagnetic material. By means of current pulses traversing one or more input windings coupled with the ferromagnetic circuit, a particular state of retentivity corresponding to a digit "0" or "1" of the coded information may be attained, for example "0" is characterized by a positive retentivity and "1" by a negative retentivity.

In the known devices the information contained in the ferromagnetic circuit is read out by measuring the voltage produced across an output winding coupled with the ferromagnetic circuit under the action of a subsequent current pulse in the said input winding.

However, this method of reading out suffers from the disadvantage that the information stored in the ferromagnetic circuit is lost on being read out and may have to be re-recorded, which firstly requires the use of auxiliary equipment which temporarily retains the information read out and thereupon re-records it in the circuit, and secondly causes loss of time. In order to obviate this disadvantage it has already been proposed to use the effects produced in a read-out winding, which is wound on the circuit, by a pulsatory magnetic field set up at right angles to the remanent flux of this circuit. This method, however, requires a second ferromagnetic circuit comprising an air gap in which part of the first circuit is arranged. Current pulses supplied to a winding supported from the second circuit produce the said pulsatory magnetic field.

It is an object of the invention to provide a different method of reading out in which the information stored in the circuit is not lost either without, however, the use of magnetic fields at right angles to the remanent flux of the ferromagnetic circuit and without the use of the second ferromagnetic circuit required to produce them, and the invention is characterized in that the circuit is provided with at least one additional winding to which current pulses are supplied which set up two magnetic fields in the circuit, one of which is active in the direction of the remanent flux of the circuit, whereas the other is active in a direction opposite to that of the remanent flux.

Figure 7:
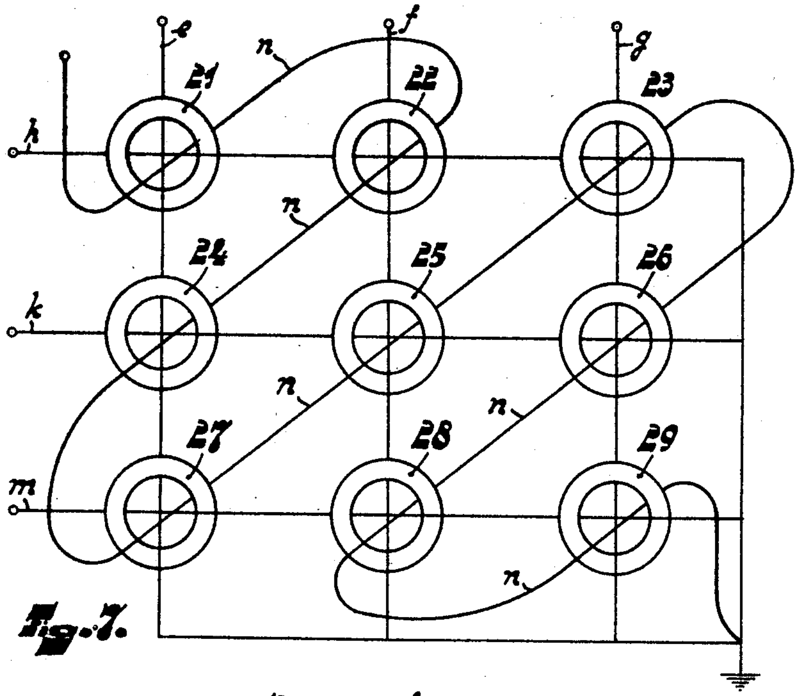

The invention will now be described more fully with reference to the accompanying drawing. In this drawing Fig. 1 shows a known device, Fig. 2 shows the hysteresis loop associated with such a device, Figs. 3, 4, 5 and 6 show devices in accordance with the invention, Fig. 7 shows a memory system in which reading out is effected in known manner and Fig. 8 a memory system consisting of devices in accordance with the invention.

Figures 1, 2, 3, 4, 5, 6:
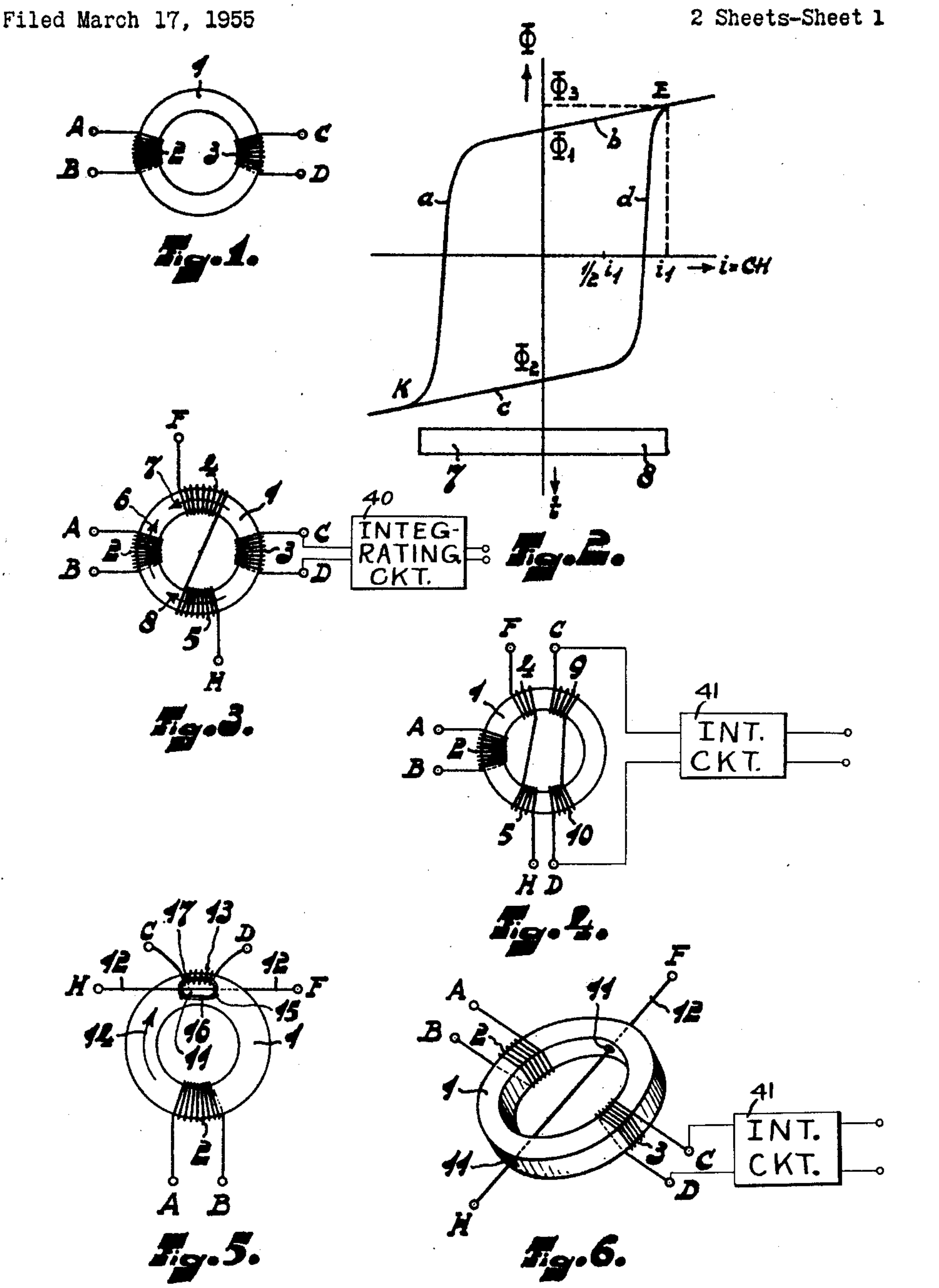

Fig. 1 shows a known device for recording coded information. Reference numeral 1 designates the ferromagnetic circuit having high retentivity and a parallelogram-shaped hysteresis loop, 2 is an input winding having terminals A and B and 3 is an output winding having terminals C and D; each of the windings 2 and 3 may, if desired, be constituted by one or more conductors merely threaded through the aperture of the circuit 1.

Fig. 2 shows the hysteresis loop of the core 1 in which the flux $\phi$ is plotted as a function of the current $i$ traversing the winding 2. At $i=0$ two state of retentivity are possible, i.e. the state $\phi_1$ and the state $\phi_2$. The state $\phi_1$ corresponds, for example, to a digit "0" of the coded information, the state $\phi_2$ to a "1." If it is assumed that the circuit is in the state $\phi_1$, a positive current pulse of value $i_1$ supplied to the terminals A and B will produce flux variations $\phi_3-\phi_1$ and $\phi_1-\phi_3$ in the core which produce voltages at the terminals C and D of the winding 3. If the circuit is in the state $\phi_2$, a positive current pulse supplied to the terminals A and B produces a flux variation $\phi_3-\phi_2$ during its ascending flank and a flux variation $\phi_1-\phi_3$ during its descending flank, which variations also produce voltages at the terminals C and D of the winding 3, the first voltage peak of which, occurring during the ascending flank of the current pulse, being materially higher than the first voltage peak occurring when the circuit is in the state $\phi_1$. In reading out the discrimination between a "0" and a "1" is thus based on the difference between the voltage peaks across the winding 3, which difference is due to the difference in the flux variations $\phi_3-\phi_1$ and $\phi_3-\phi_2$. In whichever state the circuit may be, after a current pulse $i_1$ is supplied to the terminals A and B it invariably enters the state $\phi_1$, which corresponds to a "0" of the coded information. A storing unit "1" is recorded, i.e. the circuit is caused to assume the state $\phi_2$, by supplying to the terminals A and B a negative current pulse the absolute amplitude of which is at least equal to $i_1$.

Fig. 3 shows by way of example a device in accordance with the invention. Corresponding elements of this device are designated similarly to those shown in Fig. 1. Reference numerals 4 and 5 designate two additional windings having terminals F and H. It is assumed that the core 1 is in the state $\phi_1$ and that the direction of the corresponding remanent flux is shown by the arrow 6. By means of a pulsatory current supplied to the terminals F and H of the additional windings a magnetic field is set up in the proximity of the winding 4, the direction of which field is indicated by the arrow 7, and in the proximity of the winding 5 a magnetic field is set up the direction of which is indicated by the arrow 8. In Fig. 2 these pulsatory magnetic fields are plotted as a function of the time $t$. It should be noted that in Fig. 2 the $i$-axis is also used as the axis along which the magnetic fields H are plotted, for in this case H and $i$ are proportional. Obviously, when plotting, the proportionality constant $c$ which indicates the relationship between H and $i$ must be allowed for.

From Fig. 2 it may be seen that the pulse 7, which corresponds to the field set up in the proximity of the winding 4 and is indicated by the arrow 7 in Fig. 3, produces in the adjacent portion of the core a flux variation which is determined by the part of the hysteresis loop designated $a$ in Fig. 2. Similarly the pulse 8, which corresponds to the field set up in the proximity of the winding 5 and is designated by the arrow 8 in Fig. 3, in the portion of the core adjacent the winding 5 produces a flux variation which is given by the part of the hysteresis loop designated $b$ in Fig. 2.

If the pulse 7 alone should be set up, i.e. if the pulsatory current should traverse only the winding 4, at the end of the pulse the core 1 would pass from the state $\phi_1$ to the state $\phi_2$ similarly to what has been described with reference to Fig. 1, provided this pulse should have a sufficient amplitude. It is found, however, that by the action of the pulse 8 set up in the proximity of the winding 5 this change in the state of the core 1 is prevented. At the end of the current pulse in the windings 4 and 5 the core is found to have returned completely to its original state, i.e. the state $\phi_1$. Thus, under the action of the pulse 7 the flux produced in the proximity of the winding 4 varies according to the curve $a$ in the direction $\phi_1-K$ during the ascending flank of said pulse and during its descending flank the flux varies according to said curve $a$ in the opposite direction so as to return to the state $\phi_1$ and not, as is the case with the device shown in Fig. 1, to the state $\phi_2$. Under the action of the pulse 8 the flux produced in the core portion adjacent the winding 5 varies according to the curve $b$ in the direction $\phi_1-E$ during the ascending flank of said pulse and in the opposite direction during its descending flank.

However, if the core 1 should be in the state $\phi_2$, the pulse 7 in the proximity of the winding 4 would produce a flux variation which is determined by the part of the hysteresis loop shown in Fig. 2 designated $c$ and the pulse 8 would produce in the proximity of the winding 5 a flux variation determined by the part of the hysteresis loop shown in Fig. 2 designated $d$. In this event also at the end of the current pulse the core completely returns to its original state, i.e. the state $\phi_2$.

If, now, in the proximity of the winding 5 provision should be made of a winding 3 having output terminals C and D, the flux variations occurring in this proximity would produce voltages across this winding 3 provided that the core should be in the state $\phi_1$, i.e. the state corresponding to a "0" of the coded information. As will be understood from the preceding the flux variation varies according to the curve $b$ of the hysteresis loop during the ascending flank of the current pulse supplied to the terminals F and H and during its descending flank also according to said curve $b$, but in the opposite direction. However, if the core is in the state $\phi_2$ which corresponds to a "1" of the coded information, across this winding 3 a voltage will be produced under the action of the flux variations which vary according to curve $d$. Since the curve $d$ has a very steep slope compared with the curve $b$, the voltage peaks produced across the winding 3 by the last-mentioned flux variations will materially exceed the voltage peaks produced by the flux variations occurring when the core is in the state $\phi_1$.

However, if the winding 3 should be provided in the proximity of the winding 4, the voltage peaks occurring across the winding 3 when the core is in the state $\phi_1$ materially exceed the peaks occurring when the core is in the state $\phi_2$, since the slope of the curve $a$ is considerably steeper than that of the curve $c$. It is found, however, that if the winding 3 is provided in the immediate proximity of the windings 4 or 5, the direct inductive coupling (transformer action) between the winding 3 and the windings 4 or 5 is such that the said voltage peaks, the amplitude of which is dependent upon the state of the core are not high enough relatively to the voltages produced in the winding 3 by the direct inductive coupling under the action of the current pulse supplied to the terminals F and H to permit of using the difference in amplitudes of said voltage peaks in order to ascertain the state of the core.

If, however, the winding 3 is provided symmetrically between the windings 4 and 5, the voltages produced by direct inductive coupling compensate for each other in this winding 3. The winding 3 is found to be affected not only by the flux variations occurring in the proximity of the winding 4, but also by flux variations occurring in the proximity of the winding 5. If the core is in the state $\phi_1$, the first-mentioned flux variations are again large as compared with the last-mentioned flux variations; however, if the core is in the state $\phi_2$, the first-mentioned flux variations are small as compared with the last-mentioned variations. However, if the core is in the state $\phi_1$, the resulting flux variations which will have an effect upon the winding 3 in either case are opposite to the variations occurring if the core is in the state $\phi_2$. Similarly the voltage peaks occurring at the terminals C and D will have opposite polarity according to the state of the core. The discrimination between a "0" and a "1" is now based on the difference in polarity of the voltage peaks across the winding 3. In one case during the ascending flank of the current pulse supplied to the terminals F and H a positive voltage peak occurs first and then during the descending flank of said current pulse a negative voltage peak occurs; in the other case a negative voltage peak occurs first and then a positive one. Consequently, an integrating network 40 (Fig. 3) connected to the terminals C and D will produce a positive voltage pulse in one case and a negative pulse in the other case.

Figure 4 shows a device in accordance with the invention in which the effect of the direct inductive coupling is also eliminated and in which the discrimination between a "0" and a "1" is also based on the difference in polarity of the voltage peaks set up across the output terminals of the device under the action of a current pulse supplied to the additional windings. Corresponding elements of this device are designated similarly to those shown in Figure 3. Reading out is effected with the aid of two windings 9 and 10 one of which is provided in the immediate proximity of the winding 4 whereas the other is provided in the immediate proximity of the winding 5. The winding sense of the two windings 9 and 10 is such that the voltage directly induced by the winding 4 across the winding 9 due to transformer action and the voltage similarly induced by the winding 5 across the winding 10 compensate each other. The operation of this device will be understood from the preceding; if the core is in the state $\phi_1$, comparatively large voltage peaks will occur across the winding 9 and comparatively small voltage peaks across the winding 10; if, however, the core is in the state $\phi_2$, comparatively large voltage peaks will occur across the winding 10 and comparatively small peaks across the winding 9. The polarity of the resulting voltage peaks at the terminals C and D will, however, be different according as the core is in the state $\phi_1$, or in the state $\phi_2$. In this case also the voltage peaks can be converted with the aid of an integrating network 41 connected to the terminals C and D into voltage pulses the polarity of which determines the state of the core.

Fig. 5 also shows a device in accordance with the invention. Reference numeral 1 again designates the ferromagnetic circuit having high retentivity and a parallelogram-shaped hysteresis loop and 2 is an input winding having terminals A and B. This core has an aperture 11 formed in it in which not only an additional winding 12 having terminals F and H but also the read-out winding 13 having terminals C and D are provided. If, now, a current pulse is again supplied to the terminals F and H of the winding 12, which in the figure consists of a conductor threaded through the aperture 11 but which may also be a winding provided on one of the branches 16 or 17 or a series connection of two windings each wound on one of the branches, this pulse produces a pulsatory magnetic field in the proximity of the aperture 11. If the core is in the state $\phi_1$ and the direction of the remanent flux is as shown by the arrow 14 whereas the direction of the pulsatory magnetic field is as indicated by the arrow 15, the magnetic field in a part 16 of the core is active in a direction opposite to that of the remanent flux and the magnetic field in a part 17 is active in the direction of the remanent flux. If the core is in the state $\phi_2$, the magnetic field in the part 16 of the core is active in the direction of the remanent flux whereas in the part 17 it is active in a direction opposite to that of the remanent flux. The winding 13, which in the figure is provided on the branch 17, is acted upon substantially only by the flux variations occurring in the core part 17.

Consequently, with the outlined direction of the magnetic field produced by the current pulses considerable voltage peaks will occur across terminals C and D only if the core is in the state $\phi_2$. The discrimination between a digit "0" and a "1" in this case is based on the difference in amplitude of the voltage peaks. An integrating network will produce a large voltage pulse if the core is in one state, and a small voltage pulse of equal polarity, if the core is in the other state.

However, the read-out winding 13 may also be provided on the core in a manner such that both branches are embraced. In this case only those flux variations will materially affect the branch in which the magnetic field produced by the pulsatory current has a direction opposite to that of the remanent flux. Consequently, these flux variations will always have a direction opposite to that of the remanent flux irrespective of the polarity of the current pulses, so that the polarity of the voltage peaks produced in the winding 13 under the action of the current pulses supplied to the winding 12 will only depend upon the direction of the remanent flux and not upon the polarity of the current pulses supplied to the winding 12. If an integrating network is again connected to the terminals C and D a voltage pulse will always occur the polarity of which is determined by the state of the core irrespective of the polarity of the current pulse traversing the winding 12.

It is found that the action of the flux variations in the branches 16 and 17 also extends to the non-split part of the core and that across a winding provided on the non-split part of the core similar voltage peaks occur as across a winding provided on both branches.

Since the polarity of the current pulses traversing the winding 12 does not affect the output voltages of the winding 13, in order to amplify these output voltages more than one aperture may be formed in the core and the current conductor may be passed through the apertures with any winding sense.

Fig. 6 shows an example of a core provided with more than one aperture, in the case shown a core having two apertures. Corresponding elements of this device are designated similarly to those shown in the preceding figures.

Figure 8:
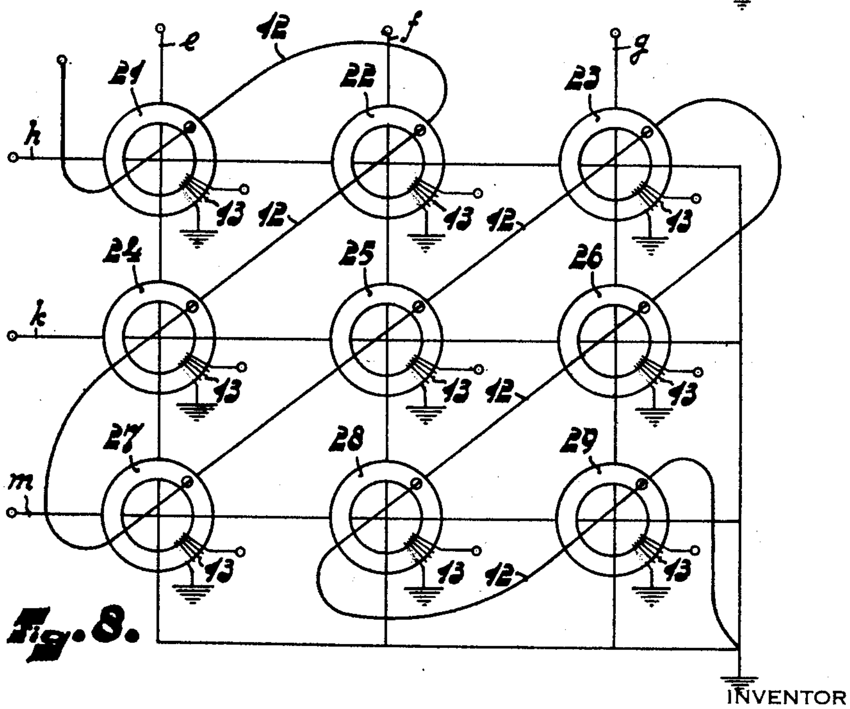

The devices in accordance with the invention may, among other things, be used with advantage in so-called memory systems. Fig. 7 shows such a memory system built up from known devices. The cores having high retentivity and parallelogram-shaped hysteresis loops are arranged in rows and columns. If all the cores 21 to 29 are in the state $\phi_1$, a digit "1" which is characterized by the state $\phi_2$ is recorded in a predetermined core by supplying a current pulse of amplitude $\frac{1}{2}i_1$ (Fig. 2) to each of the current conductors. Thus, a "1" is recorded in the core 28 by supplying a pulse to the current conductors *f* and *m*. In this event the cores 22, 25, 27 and 29 are excited by one current pulse $\frac{1}{2}i_1$. However, this pulse is too small to cause a transition from $\phi_1$ to $\phi_2$. Reading out is effected in a manner similar to that described with reference to Fig. 2. However, in this case the read-out pulse $i_1$ is constituted by two current pulses each of amplitude $\frac{1}{2}i_1$ which occur simultaneously in two conductors. If, for example, the state of the core 28 is to be determined, pulses of amplitude $\frac{1}{2}i_1$ must again be supplied to the current conductors *f* and *m*. According to the state of the core 28 a large or a small voltage peak will be produced across the common read-out winding *n*. It will be understood that the information stored in the various cores cannot be read out simultaneously and also that this information is lost during reading out. Fig. 8 shows a memory system built up from devices in accordance with the invention, in the case shown devices of the kind shown in Fig. 5. Recording of the information in a predetermined core is performed in a manner entirely similar to that used in the memory system shown in Fig. 7. Reading out, however, is effected by supplying a single current pulse to the various windings 12, which for this purpose are, for example, connected in series. Across each of the windings 13 a voltage is produced which determines the information contained in the core concerned. Thus, the entire information contained in the memory system will be available at the same instant whereas in addition this entire information is retained in the system.

What is claimed is:

1. A magnetic memory device comprising a closed core of ferromagnetic material having a substantially parallelogram-shaped hysteresis curve, an input winding coupled to a portion of said core to produce therein remanent flux in a given direction indicative of one of two informational states, an output winding coupled to another portion of said core for deriving electrical information indicative of the informational state of said core, and a read-out winding including two winding portions coupled to opposed portions of said core located symmetrically between the core portions to which the input and output windings are coupled, said two winding portions providing magnetic fields in opposite directions in said core.

2. A magnetic memory device comprising a closed core of ferromagnetic material having a substantially parallelogram-shaped hysteresis curve, an input winding coupled to a portion of said core to produce therein remanent flux in a given direction indicative of one of two informational states, an output winding coupled to an opposed portion of said core for deriving electrical information indicative of the informational state of said core, said core having a pair of radially-directed aligned apertures in portions thereof symmetrically arranged relative to the input and output windings, and a read-out winding traversing said pair of aligned apertures and providing magnetic fields in opposite directions in said core.

3. A magnetic memory device comprising a closed core of ferromagnetic material having a substantially parallelogram-shaped hysteresis curve, an input winding coupled to a portion of said core to produce therein remanent flux in a given direction indicative of one of two informational states, an output winding coupled to another portion of said core for deriving electrical information indicative of the informational state of said core, a read-out winding including two winding portions coupled to opposed portions of said core located symmetrically between the core portions to which the input and output windings are coupled, said two winding portions providing magnetic fields in opposite directions in said core, and an integrating circuit coupled to the output winding to provide the derived electrical information in polarity terms.

4. A magnetic memory device as set forth in claim 3 wherein the output winding comprises two series-connected winding portions coupled to portions of the core in proximity to the read-out winding portions.

5. A magnetic memory device comprising a closed core of ferromagnetic material having a substantially parallelogram-shaped hysteresis curve, an input winding coupled to a portion of said core to produce therein remanent flux in a given direction indicative of one of two informational states, an output winding coupled to an opposed portion of said core for deriving electrical information indicative of the informational state of said core, said core having a pair of radially-directed aligned apertures in portions thereof symmetrically arranged relative to the input and output windings, a read-out winding traversing said pair of aligned apertures and providing magnetic fields in opposite directions in said core, and an integrating circuit coupled to the output winding to provide the derived electrical information in polarity terms.

References Cited in the file of this patent

UNITED STATES PATENTS 2,519,425 Barlow ---------------- Aug. 22, 1950

2,519,426 Grant ---------------- Aug. 22, 1950

2,614,167 Kamm ---------------- Oct. 14, 1952

OTHER REFERENCES

Communications and Electronics, January 1954, pp. 822–830.